(12) United States Patent
Bekan et al.

(10) Patent No.: US 11,498,545 B2
(45) Date of Patent: Nov. 15, 2022

(54) SYSTEM AND METHOD FOR AUTOMATICALLY SETTING VEHICLE FUNCTIONS

(71) Applicant: Bayerische Motoren Werke Aktiengesellschaft, Munich (DE)

(72) Inventors: Adnan Bekan, Munich (DE); Daniel Wilms, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/761,535

(22) PCT Filed: Feb. 11, 2019

(86) PCT No.: PCT/EP2019/053316
§ 371 (c)(1),
(2) Date: May 5, 2020

(87) PCT Pub. No.: WO2019/162129
PCT Pub. Date: Aug. 29, 2019

(65) Prior Publication Data
US 2020/0377074 A1 Dec. 3, 2020

(30) Foreign Application Priority Data
Feb. 21, 2018 (DE) ............ 10 2018 202 623.8

(51) Int. Cl.
*B60W 20/12* (2016.01)
*B60W 30/182* (2020.01)
(Continued)

(52) U.S. Cl.
CPC .......... *B60W 20/12* (2016.01); *B60W 30/182* (2013.01); *G01C 21/3415* (2013.01);
(Continued)

(58) Field of Classification Search
None
See application file for complete search history.

(56) References Cited

U.S. PATENT DOCUMENTS

2003/0078707 A1* 4/2003 Shioda ............... B60W 10/04
701/22
2009/0240388 A1* 9/2009 Harris .................. B60L 58/40
701/22
(Continued)

FOREIGN PATENT DOCUMENTS

CN 102314766 A 1/2012
CN 105612092 A 5/2016
(Continued)

OTHER PUBLICATIONS

Fujitsu Limited; Machine Translation of EP 2689982; Jan. 2014; espacenet.com (Year: 2014).*
(Continued)

*Primary Examiner* — David P. Merlino
(74) *Attorney, Agent, or Firm* — Crowell & Moring LLP

(57) ABSTRACT

A system and method automatically sets vehicle functions of a vehicle, while taking account of external influencing factors. The system includes at least one back-end server which is configured to receive vehicle data of the vehicle and, while taking account of at least part of the vehicle data, to determine data with regard to external influencing factors. The back-end server is configured to determine optimal settings of the vehicle functions of the vehicle, while taking account of the vehicle data and the data with regard to the external influencing factors, and to transmit the optimum settings of the vehicle functions to the vehicle. The vehicle is configured to control the vehicle functions such that the optimum vehicle functions determined by the back-end server are adopted.

10 Claims, 2 Drawing Sheets

(51) Int. Cl.
*G01C 21/34* (2006.01)
*G01C 21/36* (2006.01)

(52) U.S. Cl.
CPC ..... *G01C 21/3461* (2013.01); *G01C 21/3691* (2013.01); *B60W 2554/406* (2020.02); *B60W 2555/20* (2020.02); *B60W 2555/60* (2020.02); *B60W 2556/45* (2020.02)

(56) References Cited

U.S. PATENT DOCUMENTS

| | | | |
|---|---|---|---|
| 2010/0211247 A1* | 8/2010 | Sherony | B60W 40/076 701/1 |
| 2010/0274422 A1 | 10/2010 | Schrey et al. | |
| 2010/0299054 A1* | 11/2010 | Hennequet | G01C 21/3492 701/123 |
| 2011/0029170 A1* | 2/2011 | Hyde | B60W 50/082 701/1 |
| 2012/0221215 A1* | 8/2012 | Sugiyama | G09B 29/007 701/51 |
| 2013/0124028 A1* | 5/2013 | Ang | H02J 7/007182 180/65.265 |
| 2014/0379170 A1* | 12/2014 | Muetzel | B60W 30/182 701/1 |
| 2015/0232097 A1* | 8/2015 | Luther | B61L 27/16 701/1 |
| 2017/0076509 A1* | 3/2017 | Scofield | A61B 5/02055 |
| 2017/0116485 A1* | 4/2017 | Mullen | G08G 1/052 |
| 2018/0015930 A1* | 1/2018 | Sarosi | B60W 30/182 |
| 2018/0170349 A1* | 6/2018 | Jobson | B60W 20/40 |
| 2019/0048809 A1* | 2/2019 | Fox | B60W 30/182 |
| 2019/0100204 A1* | 4/2019 | Plianos | B60W 30/18072 |
| 2019/0162154 A1* | 5/2019 | Pompea | G06Q 20/3223 |
| 2020/0079347 A1* | 3/2020 | Ueda | F02D 29/02 |
| 2021/0370902 A1* | 12/2021 | Frenzel | B60T 13/748 |

FOREIGN PATENT DOCUMENTS

| | | | |
|---|---|---|---|
| DE | 10 2007 026 320 A1 | 1/2009 | |
| DE | 10 2009 002 385 A1 | 10/2010 | |
| DE | 10 2012 011 501 A1 | 12/2013 | |
| DE | 10 2013 223 331 A | 5/2015 | |
| EP | 2 689 982 A1 | 1/2014 | |
| ES | 2735399 T3 * | 12/2019 | ........ B60W 50/0097 |
| GB | 2547714 A | 8/2017 | |
| JP | 2007093229 A * | 4/2007 | |
| WO | WO 2016/202360 A1 | 12/2016 | |
| WO | WO2017100613 A1 | 6/2017 | |

OTHER PUBLICATIONS

Masutani, Tomohiko; Machine translation of JP-2007093229-A; Apr. 2007; espacenet.com (Year: 2007).*
International Search Report (PCT/ISA/210) issued in PCT Application No. PCT/EP2019/053316 dated Jun. 4, 2019 with English translation (seven (7) pages).
German-language Office Action issued in German Application No. 10 2018 202 623.8 dated Jun. 15, 2022 (six (6) pages).
Schlote et al., "Cooperative Regulation and Trading of Emissions Using Plug-in Hybrid Vehicles", IEEE Transactions on Intelligent Transportation Systems, vol. 14, No. 4, Dec. 2013, pp. 1572-1585.
Chinese-language Office Action issued in Chinese Application No. 201980005673.7 dated Sep. 5, 2022, with English Translation (16 pages).

* cited by examiner

SYSTEM AND METHOD FOR AUTOMATICALLY SETTING VEHICLE FUNCTIONS

BACKGROUND AND SUMMARY OF THE INVENTION

The present invention relates to a system and a method for automatically setting vehicle functions taking into account external influencing factors.

More and more conurbations are confronted with the problem of traffic-related air pollution. The result is therefore more and more frequently the introduction of so-called environmental zones. The use by emitting and/or highly emitting vehicles is restricted or prohibited in the environmental zones on account of acute traffic-related air pollution. There is traffic-related air pollution if previously defined air quality limit values are not complied with or are exceeded. If a driver is not informed in good time of sometimes highly dynamic traffic restrictions and/or traffic bans caused by emitting vehicles, the result in the worst case scenario may be that the user or driver of the affected vehicle cannot use or drive through the environmental zone. This may result in the user or driver not being able to reach a particular destination or being able to reach a particular destination only with a considerable time delay, for example by bypassing the environmental zone, even though the vehicle could comply with dynamic requirements of conurbations with respect to emission values using particular vehicle functions.

The object of the invention is to avoid the disadvantages mentioned above and to provide a solution which makes it possible to automatically set vehicle functions with respect to external influencing factors.

This object is achieved, according to the invention, by means of the features of the independent claims. The dependent claims relate to preferred embodiments.

The object mentioned above is achieved by a system for automatically setting vehicle functions of a vehicle taking into account external influencing factors, comprising:
 at least one back-end server which is configured:
  to receive vehicle data relating to the vehicle;
  to determine data with respect to the external influencing factors taking into account at least some of the vehicle data;
  to determine optimum settings of vehicle functions of the vehicle taking into account the vehicle data and the data with respect to the external influencing factors; and
  to transmit the optimum settings of the vehicle functions to the vehicle;
 wherein the vehicle is configured to control the vehicle functions in such a manner that the determined optimum vehicle functions are adopted.

The term vehicle comprises automobiles, trucks, buses, mobile homes, motorcycles, etc. which are used to convey persons, goods, etc. In particular, the term comprises motor vehicles for conveying persons.

The vehicle may comprise a communication module. The communication module is able to set up a communication connection to other communication participants, for example other vehicles, the back-end server, mobile terminals etc., in order to transmit data. The communication module may comprise a subscriber identity module or a SIM card (not shown) which is used to set up a communication connection via a mobile radio system. In this case, the subscriber identity module uniquely identifies the communication module in the mobile radio network. The communication connection may be a data connection (for example packet switching) and/or a line-connected communication connection (for example circuit switching). A wireless communication connection using further common and future technologies, for example local area networks (LANs), for example wireless LANs etc., can also be set up to other communication participants via the communication module In particular, the vehicle can set up a communication connection to the back-end server via the communication module in order to transmit the vehicle data to the back-end server. The vehicle may be configured, for example, to transmit vehicle data to the back-end server during driving.

For example, the back-end server may be configured to create a digital twin for each—previously appropriately registered-vehicle. A digital twin is a virtual representation of a physical object. The digital twin of a vehicle in the sense of this application comprises, in particular, a digital representation of vehicle data in the back-end server. In particular, a digital twin is a dedicated environment for storing vehicle data, retrieving the latter and/or recording changes. The vehicle data comprise sensor data. The vehicle may be configured to transmit the sensor data to the back-end server at regular intervals, for example every 0.1 second (s), 0.5 second (s), every 1 s, every 1.5 s, etc., and/or for predefined events, for example after each data capture, each second data capture, etc. by the respective sensor. The digital twin may comprise one or more data models for processing the vehicle data.

The back-end server is configured to determine data with respect to the external influencing factors taking into account at least some of the vehicle data relating to the vehicle. For example, the back-end server itself may be configured to provide at least one telematics service. The telematics service may comprise the determination and provision of data with respect to the external influencing factors. As part of this telematics service, the data with respect to external influencing factors may be received and/or retrieved (polling) from one or more service providers for predefined events. Additionally or alternatively, the back-end server may be configured to retrieve data with respect to the external influencing factors—taking into account at least some of the vehicle data—from at least one external service provider for predefined events. A service provider may be an Internet service provider providing, via the Internet, services, contents and/or technical services which are needed to use or run contents and services on the Internet. Predefined events may comprise, for example: periodic, for example every 1 second, every 2 seconds, every minute, every 5 minutes, etc. Additionally or alternatively, predefined events may comprise: after receiving vehicle data and/or in the case of other suitable predefined events.

For example, the at least one telematics service may comprise the provision of quasi-real-time information with respect to current air quality values in affected agglomerations (for example conurbations and/or densely populated areas and/or urban centers and/or downtown areas etc.). Additionally or alternatively, the at least one telematics service may comprise the provision of highly up-to-date restrictions or bans with respect to the use of the respective agglomerations by emitting and/or highly emitting vehicles on account of traffic-related air pollution and/or further reasons.

The back-end server is configured to determine optimum settings of vehicle functions taking into account the vehicle data and the data with respect to the external influencing factors. This can be effected using a suitable computing unit. In a next step, the back-end server may be configured to transmit the optimum settings of the vehicle functions to the vehicle. In the vehicle, the affected vehicle functions can be controlled in such a manner that the optimum vehicle functions determined by the back-end server taking into account the external influencing factors are automatically adopted.

The vehicle can advantageously automatically adapt vehicle functions to highly dynamic external influencing factors without the need for intervention by the driver or user of the vehicle.

The external influencing factors preferably comprise:
up-to-date air quality values;
up-to-date driving restrictions in environmental zones for emitting and/or highly emitting vehicles; and/or
local traffic specifications and/or traffic regulations which apply on the route.

Up-to-date air quality values comprise, in particular, up-to-date values with respect to traffic-related air pollution. There is traffic-related air pollution if air quality limit values previously stipulated by authorities, for example, are not complied with.

The term environmental zone comprises areas in urban agglomerations (such as a megalopolis) in which the use by emitting and/or highly emitting vehicles is restricted or prohibited on account of traffic-related air pollution. In particular, the driving restrictions or driving bans of emitting and/or highly emitting vehicles can be effected in a highly dynamic manner with respect to up-to-date air quality values.

For example, each agglomeration can communicate appropriate, highly dynamic driving restrictions or driving bans via a so-called "smart city" concept. "Smart city" is a collective term for complete development concepts which are aimed at making cities or agglomerations more efficient, technologically more advanced and greener. These concepts comprise technical and social innovations. "Smart city" comprises the dimension of mobility or "smart mobility". This dimension is distinguished by the fact that it is energy-efficient and has low emissions. In particular, the existing infrastructure is improved by using information and communication technologies which help to monitor the traffic. The traffic monitoring comprises the recording of up-to-date air quality values.

Therefore, up-to-date air quality values and/or up-to-date driving restrictions can be automatically captured, as external influencing factors in environmental zones for emitting and/or highly emitting vehicles, for example automatically using suitable information and communication technologies, and can be transmitted to the back-end server.

Additionally or alternatively, external influencing factors may comprise local traffic specifications and/or traffic regulations which apply on a (planned) route.

The back-end server can determine optimum settings of vehicle functions taking into account the external influencing factors.

The vehicle data preferably comprise:
current emission status data relating to the vehicle; and/or
at least one planned destination of the vehicle, wherein the planned destination of the vehicle can comprise a latest arrival time of the vehicle at the planned destination.

The vehicle data may comprise current emission status data relating to the vehicle. Emission status data comprise all data which are related to emissions or emission values of the vehicle. For example, emission status data comprise:
data relating to different driving modes of the vehicle which influence the vehicle emissions of the vehicle, for example sport mode (higher vehicle emissions), ECO PRO mode (lower vehicle emissions); purely electrical (no emissions), and/or
data relating to vehicle emissions of the vehicle with respect to the driving speed; and/or
data relating to the remaining range of the vehicle with respect to one or more energy stores (for example tank level, state of charge of the vehicle battery, etc.).

Additionally or alternatively, the vehicle data may comprise at least one planned destination of the vehicle. The planned destination may comprise a latest arrival time at the planned destination.

The planned destination and a latest arrival time of the vehicle at the planned destination can be transmitted to the back-end server. For example, a user of the vehicle can input a planned destination using the navigation system and/or a suitable mobile terminal coupled to the vehicle. The destination can be transmitted from the vehicle or the mobile terminal (for example smartphone) to the back-end server. In addition, further personal data relating to the user of the vehicle can be transmitted from the vehicle or the mobile terminal to the back-end server, for example data from a personal electronic calendar, via which a latest arrival time at the planned destination can be calculated or determined. The latest arrival time can also be input by the user of the vehicle via an input and output unit of the vehicle or of the mobile terminal and can be transmitted to the back-end server.

The back-end server can determine optimum settings of vehicle functions taking into account the vehicle data.

The vehicle functions preferably comprise:
a maximum speed which is needed
to circumvent up-to-date driving restrictions in environmental zones; and/or
to comply with local traffic specifications and/or traffic regulations; and/or
a modified route which is needed to circumvent up-to-date driving restrictions in environmental zones and/or local traffic specifications and/or traffic regulations; and/or
driving modes which influence the vehicle emissions of the vehicle.

For example, the back-end server can determine, taking into account the vehicle data and the external influencing factors, a maximum speed which is needed or must be complied with in order to circumvent up-to-date driving restrictions in environmental zones, since the emission values at the determined maximum speed are such that driving restrictions are circumvented. Additionally or alternatively, the back-end server can determine, taking into account the vehicle data and the external influencing factors, a maximum speed which is needed or must be complied with in order to comply with local traffic specifications and/or traffic regulations. In other words, the vehicle functions may comprise throttling of the vehicle to the determined maximum speed.

Additionally or alternatively, the back-end server can determine a modified (for example non-optimum) route which is needed to circumvent or bypass up-to-date driving restrictions in environmental zones. For example, up-to-date driving restrictions may require that only emission-free vehicles can drive in or through the environmental zone of an urban area, whereas the vehicle is driven by an internal combustion engine. In this case, the back-end server can determine a required bypass of the environmental zone. Additionally or alternatively, the back-end server may be configured to determine a modified (for example non-optimum) route which is needed to circumvent local traffic specifications and/or traffic regulations. In other words, the vehicle functions may comprise automatic route adaptations.

Additionally or alternatively, the vehicle functions may comprise driving modes which influence the vehicle emissions or the emission rate of the vehicle. Such driving modes may comprise an "ECO PRO" driving mode which reduces the emission rate of the vehicle.

The back-end server can advantageously determine optimum settings of vehicle functions taking into account the vehicle data and the external influencing factors, which optimum settings can then be transmitted or transferred to the vehicle. These settings are then automatically adopted by the vehicle.

The vehicle is preferably a hybrid vehicle, wherein the vehicle functions comprise operating modes of the vehicle.

The term hybrid vehicle comprises vehicles which are used to convey persons, goods, etc. and have a hybrid drive concept. In particular, however, the term comprises land vehicles, for example motor vehicles for conveying persons with hybrid drive concepts.

Vehicles with hybrid drive concepts or hybrid drives (hybrid vehicles) are distinguished by the fact that their drive is composed of at least two different drives which are supplied by respectively different energy stores. For example, the drive combination of electric motor and internal combustion engine may exist. The energy stores are then the battery—for example lithium ion rechargeable battery—as the electrical energy store—and the fuel tank. Modern hybrid vehicles make it possible for their users or drivers to choose from different operating modes with respect to the hybrid drive concepts. For example, in the case of the above-mentioned drive combination of an electric motor and an internal combustion engine, it is possible to provide an "automatic" operating mode in which the vehicle chooses the optimum drive variant taking into account vehicle-specific parameters—for example taking into account power and energy consumption—and decides whether the hybrid vehicle is driven solely by the electric motor, solely by the internal combustion engine or by both the motor and the engine in a parallel manner. Another example is the "electrical" operating mode that can be provided for selection, in which the drive is effected purely by the electric motor. In addition, a "conventional" operating mode can be provided for selection, in which the drive is effected purely by the internal combustion engine. In a further example, it is possible to choose the "charging" operating mode in which the electrical energy store is charged by the internal combustion engine in order to increase the purely electrical range of the vehicle.

In case of hybrid vehicles, the vehicle functions may comprise the operating modes of the vehicle. For areas which cannot be entered by emitting vehicles, the back-end server can advantageously automatically determine an "electrical" operating mode and can transmit it to the vehicle, where this operating mode is automatically selected in the area.

In one example, the vehicle data can comprise a planned route of a hybrid vehicle. The back-end server can determine, taking into account the planned route as an external influencing factor, that a route section of a length of 25 kilometers (km) on the planned route can be used only by emission-free vehicles. The back-end server can read, from the digital twin stored for the hybrid vehicle, that the hybrid vehicle has only a purely electrical remaining range of 20 km. In this case, the back-end server can determine, as the optimum setting of a vehicle function, taking into account the vehicle data and the external influencing factors, that the "charging" operating mode must be selected in order to charge the electrical energy store of the hybrid vehicle by means of the internal combustion engine. As a further optimum setting of a vehicle function, the back-end server can determine that the operating mode is "electrical" shortly before entering the route section which can be used only in a purely electrical manner.

The back-end server can transmit the determined optimum settings of the vehicle functions to the vehicle. The vehicle can control the vehicle, with the aid of a control unit, in such a manner that the "charging" operating mode is set. Shortly before reaching the section which can be used in a purely electrical manner, the control unit can control the vehicle such that the "purely electrical" operating mode is set.

In the case of hybrid vehicles, the operating modes can be advantageously automatically adopted in the vehicle along the section, as required by the external influencing factors with respect to the vehicle data.

According to a second aspect, the underlying object is achieved by means of a method for automatically setting vehicle functions of a vehicle taking into account external influencing factors, comprising:

receiving, at a back-end server, vehicle data relating to the vehicle;

determining, at the back-end server, data with respect to the external influencing factors taking into account at least some of the vehicle data;

determining, by means of the back-end server, optimum settings of vehicle functions of the vehicle taking into account the vehicle data and the data with respect to the external influencing factors; and controlling the vehicle functions of the vehicle in such a manner that the determined optimum vehicle functions are adopted.

The external influencing factors preferably comprise:
up-to-date air quality values;
up-to-date driving restrictions in environmental zones for emitting and/or highly emitting vehicles; and/or
local traffic specifications and/or traffic regulations which apply on the route.

The vehicle data preferably comprise:
current emission status data relating to the vehicle; and/or
at least one planned destination of the vehicle, wherein the planned destination of the vehicle can comprise a latest arrival time of the vehicle at the planned destination.

The vehicle functions preferably comprise:
a maximum speed which is needed
  to circumvent up-to-date driving restrictions in environmental zones; and/or
  to comply with local traffic specifications and/or traffic regulations; and/or
a modified route which is needed to circumvent up-to-date driving restrictions in environmental zones and/or local traffic specifications and/or traffic regulations; and/or
driving modes which influence the vehicle emissions of the vehicle.

The vehicle is preferably a hybrid vehicle, wherein the vehicle functions comprise operating modes of the vehicle.

These and other objects, features and advantages of the present invention are illustrated by the study of the following detailed description of preferred embodiments and the accompanying figures. It is clear that—although embodiments are described separately—individual features therefrom can be combined to form additional embodiments.

DETAILED DESCRIPTION OF THE DRAWINGS

Figure 1:
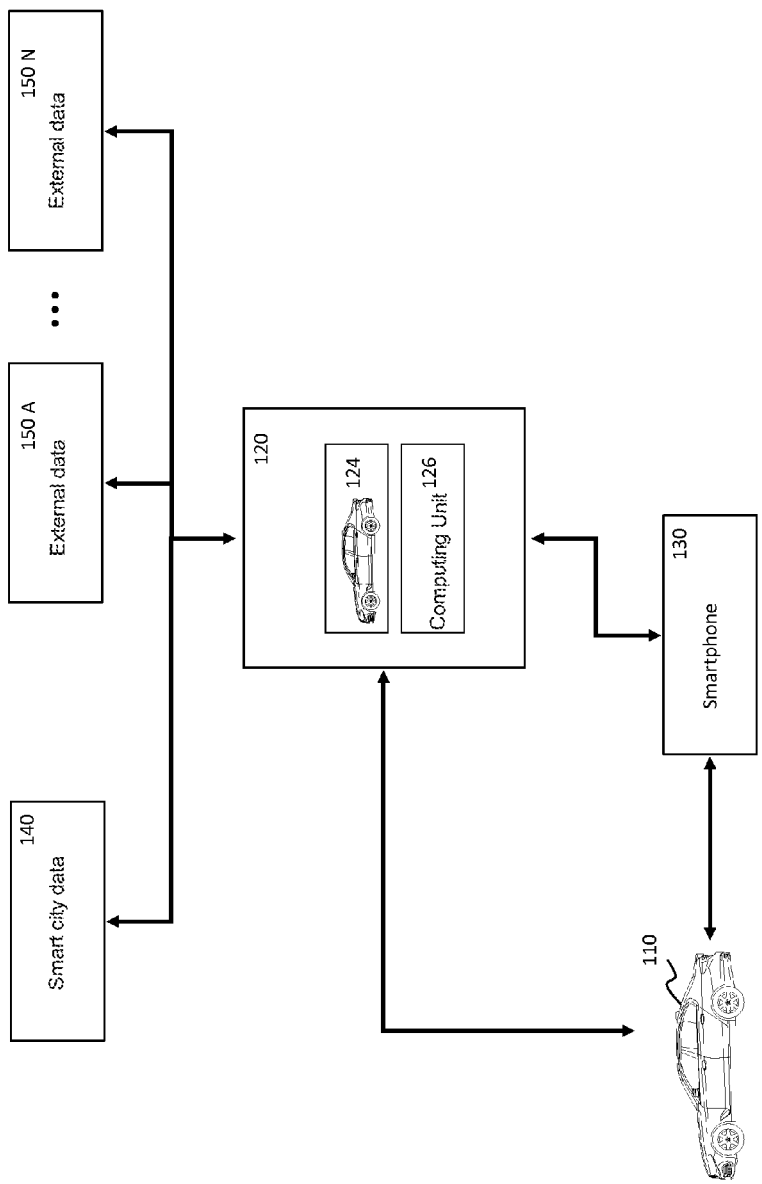
FIG. 1 shows a schematic system for automatically setting vehicle functions of a vehicle taking into account external vehicle functions.

FIG. 1 schematically shows an exemplary system 100 for automatically setting vehicle functions of a vehicle 110 taking into account external vehicle functions. A method 200, as explained in more detail further below with respect to FIG. 2, can be carried out on the system 100.

The system 100 comprises at least one back-end server 120 or a back-end computing device 120. The back-end server 120 is configured to receive vehicle data relating to the vehicle 110.

The vehicle 110 may comprise a communication module (not shown). The communication module is able to set up a communication connection to other communication participants, for example other vehicles, the back-end server, mobile terminals etc., in order to transmit data. The communication module may comprise a subscriber identity module or a SIM card (not shown) which is used to set up a communication connection via a mobile radio system. In this case, the subscriber identity module uniquely identifies the communication module in the mobile radio network. The communication connection may be a data connection (for example packet switching) and/or a line-connected communication connection (for example circuit switching). A wireless communication connection using further common and future technologies, for example local area networks (LANs), for example wireless LANs etc., can also be set up to other communication participants via the communication module.

In particular, the vehicle 110 can set up a communication connection to the back-end server 120 via the communication module in order to transmit the vehicle data to the back-end server 120. The vehicle 110 may be configured, for example, to transmit vehicle data to the back-end server during driving.

The vehicle data may comprise current emission status data relating to the vehicle 110. Emission status data comprise all data which are related to emissions or emission values of the vehicle 110.

For example, emission status data comprise:
data relating to different driving modes of the vehicle 110 which influence the vehicle emissions of the vehicle 110, for example sport mode (higher vehicle emissions), ECO PRO mode (lower vehicle emissions); and/or
data relating to vehicle emissions of the vehicle 110 with respect to the driving speed; and/or
data relating to the remaining range of the vehicle 110 with respect to one or more energy stores (for example tank level, state of charge of the vehicle battery, etc.).

Additionally or alternatively, the vehicle data may comprise at least one planned destination of the vehicle 110. The planned destination may comprise a latest arrival time at the planned destination.

The planned destination and a latest arrival time of the vehicle 110 at the planned destination can be transmitted to the back-end server 120. For example, a user of the vehicle 110 can input a planned destination using the navigation system and/or a suitable mobile terminal 130 coupled to the vehicle 110. The destination can be transmitted from the vehicle 110 or the mobile terminal 130 (for example smartphone) to the back-end server 120. In addition, further personal data relating to the user of the vehicle can be transmitted from the vehicle 110 or the mobile terminal 130 to the back-end server 120, for example data from a personal electronic calendar, via which a latest arrival time at the planned destination can be calculated or determined. The latest arrival time can also be input by the user of the vehicle 110 via an input and output unit of the vehicle 110 or of the mobile terminal 130 and can be transmitted to the back-end server 120. The user of the vehicle 110 may be its driver.

For example, the back-end server 120 may be configured to create a digital twin 124 for each—previously appropriately registered—vehicle 110. A digital twin is a virtual representation of a physical object. The digital twin 124 of a vehicle 110 comprises, in particular, a digital representation of vehicle data relating to the vehicle 110 in the back-end server 120. In particular, a digital twin is a dedicated environment for storing vehicle data, retrieving the latter and/or recording changes. The vehicle data comprise sensor data. The vehicle may be configured to transmit the sensor data to the back-end server 120 at regular intervals, for example every 0.1 second (s), 0.5 second (s), every 1 s, every 1.5 s, etc., and/or for predefined events, for example after each data capture, each second data capture, etc. by the respective sensor. The digital twin may comprise one or more data models for processing the vehicle data.

The back-end server 120 is configured to determine data with respect to the external influencing factors taking into account at least some of the received vehicle data relating to the vehicle 110.

In this case, the external influencing factors may comprise:
up-to-date air quality values;
up-to-date driving restrictions in environmental zones for emitting and/or highly emitting vehicles; and/or
local traffic situation, traffic specifications and/or traffic regulations which apply on the route.

Up-to-date air quality values comprise, in particular, up-to-date values with respect to traffic-related air pollution. There is traffic-related air pollution if air quality limit values previously stipulated by authorities, for example, are not complied with.

The term environmental zone comprises areas in urban agglomerations in which the use by emitting and/or highly emitting vehicles is restricted or prohibited on account of traffic-related air pollution. In particular, the driving restrictions or driving bans of emitting and/or highly emitting vehicles can be effected in a highly dynamic manner with respect to up-to-date air quality values.

For example, each agglomeration can communicate appropriate, highly dynamic driving restrictions or driving bans via a so-called "smart city" concept 140. "Smart city" is a collective term for complete development concepts which are aimed at making cities or agglomerations more efficient, technologically more advanced and greener. These concepts comprise technical and social innovations. "Smart city" comprises the dimension of mobility or "smart mobility". This dimension is distinguished by the fact that it is energy-efficient and has low emissions. In particular, the existing infrastructure is improved by using information and communication technologies which help to monitor the traffic. The traffic monitoring comprises the recording of up-to-date air quality values.

Therefore, up-to-date air quality values and/or up-to-date driving restrictions can be automatically captured, as external influencing factors in environmental zones for emitting and/or highly emitting vehicles 110, for example automatically using suitable information and communication technologies 140, and can be transmitted to the back-end server 120.

Additionally or alternatively, external influencing factors may comprise local traffic specifications and/or traffic regulations which apply on a (planned) route.

The back-end server can determine optimum settings of vehicle functions taking into account the vehicle data relating to the vehicle 110 and the external influencing factors.

For example, the back-end server 120 itself may be configured to provide at least one telematics service. The telematics service may comprise the determination and provision of data with respect to the external influencing factors. As part of this telematics service, the data with respect to external influencing factors may be received and/or retrieved (polling) from one or more service providers for predefined events. Additionally or alternatively, the back-end server 120 may be configured to retrieve data with respect to the external influencing factors—taking into account at least some of the vehicle data—from at least one external service provider 150A . . . 150N for predefined events. A service provider 150 A . . . 150 N may be an Internet service provider providing, via the Internet, services, contents and/or technical services which are needed to use or run contents and services on the Internet. Predefined events may comprise, for example: periodic, for example every 1 second, every 2 seconds, every minute, every 5 minutes etc. Additionally or alternatively, predefined events may comprise: after receiving vehicle data and/or in the case of other suitable predefined events.

For example, the at least one telematics service may comprise the provision of quasi-real-time information with respect to current air quality values in affected agglomerations (for example conurbations and/or urban areas and/or densely populated areas and/or downtown areas). Additionally or alternatively, the at least one telematics service may comprise the provision of highly up-to-date restrictions or bans with respect to the use of the respective agglomerations by emitting and/or highly emitting vehicles on account of traffic-related air pollution and/or further reasons.

The back-end server 120 is configured to determine optimum settings of vehicle functions taking into account the vehicle data relating to the vehicle 110 and the data with respect to the external influencing factors. This can be affected using a suitable computing unit 126.

The vehicle functions may comprise:
a maximum speed which is needed
to circumvent up-to-date driving restrictions in environmental zones; and/or
to comply with local traffic specifications and/or traffic regulations; and/or
a modified route which is needed to circumvent up-to-date driving restrictions in environmental zones and/or local traffic specifications and/or traffic regulations; and/or
driving modes which influence the vehicle emissions of the vehicle 110.

For example, the back-end server 120 can determine, taking into account the vehicle data and the external influencing factors, a maximum speed which is needed or must be complied with in order to circumvent up-to-date driving restrictions in environmental zones, since the emission values at the determined maximum speed are such that driving restrictions are circumvented. Additionally or alternatively, the back-end server 120 can determine, taking into account the vehicle data and the external influencing factors, a maximum speed of the vehicle 110 which is needed or must be complied with in order to comply with local traffic specifications and/or traffic regulations. In other words, the vehicle functions may comprise throttling of the vehicle 110 to the determined maximum speed.

Additionally or alternatively, the back-end server 120 can determine a modified (for example non-optimum) route which is needed to circumvent up-to-date driving restrictions in environmental zones or to bypass one or more environmental zones. For example, up-to-date driving restrictions may require that only emission-free vehicles can drive in or through the environmental zone of an urban area, whereas the specific vehicle 110 is driven by an internal combustion engine. In this case, the back-end server 120 can determine a required bypass of the corresponding environmental zone. Additionally or alternatively, the back-end server 120 may be configured to determine a modified (for example non-optimum) route which is needed to circumvent local traffic specifications and/or traffic regulations. In other words, the vehicle functions may comprise automatic route adaptations.

Additionally or alternatively, the vehicle functions may comprise driving modes which influence the vehicle emissions or the emission rate of the vehicle 110. Such driving modes may comprise an "ECO PRO" driving mode which reduces the emission rate of the vehicle 110.

In a next step, the back-end server 120 may be configured to transmit the optimum settings of the vehicle functions to the vehicle 110.

In the vehicle 110, the affected vehicle functions can be controlled in such a manner that the optimum vehicle functions determined by the back-end server 120 are automatically adopted taking into account the external influencing factors.

The vehicle 110 can therefore advantageously automatically adapt vehicle functions to highly dynamic external influencing factors without the need for intervention by the driver of the vehicle 110.

If the vehicle 110 is a hybrid vehicle, the vehicle functions may comprise operating modes of the vehicle 110.

Hybrid vehicles are vehicles with hybrid drive concepts or hybrid drives (hybrid vehicles). They are distinguished by the fact that their drive is composed of at least two different drives which are supplied by respectively different energy stores. For example, the drive combination of electric motor and internal combustion engine may exist. The energy stores are then the battery—for example lithium ion rechargeable battery—as the electrical energy store—and the fuel tank. Modern hybrid vehicles make it possible for their users or drivers to choose from different operating modes with respect to the hybrid drive concepts. For example, in the case of the above-mentioned drive combination of an electric motor and an internal combustion engine, it is possible to provide an "automatic" operating mode in which the vehicle chooses the optimum drive variant taking into account vehicle-specific parameters—for example taking into account power and energy consumption—and decides whether the hybrid vehicle is driven solely by the electric motor, solely by the internal combustion engine or by both the motor and the engine in a parallel manner. Another example is the "electrical" operating mode that can be provided for selection, in which the drive is effected purely by the electric motor. In addition, a "conventional" operating mode can be provided for selection, in which the drive is effected purely by the internal combustion engine. In a further example, it is possible to choose the "charging" operating mode in which the electrical energy store is charged by means of the internal combustion engine in order to increase the pure electrical range of the vehicle.

In case of hybrid vehicles, the vehicle functions may comprise the operating modes of the vehicle. For areas which cannot be entered by emitting vehicles, the back-end server can advantageously automatically determine an "electrical" operating mode and can transmit it to the vehicle, where this operating mode is automatically selected in the area.

In the case of hybrid vehicles, the operating modes can be advantageously automatically adopted in the vehicle along the section, as required by the external influencing factors with respect to the vehicle data.

In one example, the vehicle data can comprise a planned route of a hybrid vehicle 110. The back-end server 120 can determine, taking into account the planned route as an external influencing factor, that a route section of a length of 25 kilometers (km) on the planned route can be used only by emission-free vehicles. The back-end server 120 can read, from the digital twin stored for the hybrid vehicle 110, that the hybrid vehicle 110 has only a purely electrical remaining range of 20 km. In this case, the back-end server 120 can determine, as the optimum setting of a vehicle function, taking into account the vehicle data and the external influencing factors, that the "charging" operating mode must be selected in order to charge the electrical energy store of the hybrid vehicle by means of the internal combustion engine. As a further optimum setting of a vehicle function, the back-end server 120 can determine that the operating mode is "electrical" shortly before entering the route section which can be used only in a purely electrical manner.

The back-end server 120 can transmit the determined optimum settings of the vehicle functions to the vehicle 110. The vehicle 110 can control the vehicle 110, with the aid of a control unit, in such a manner that the "charging" operating mode is set. Shortly before reaching the section which can be used in a purely electrical manner, the control unit can control the vehicle 110 such that the "purely electrical" operating mode is set.

Figure 2:
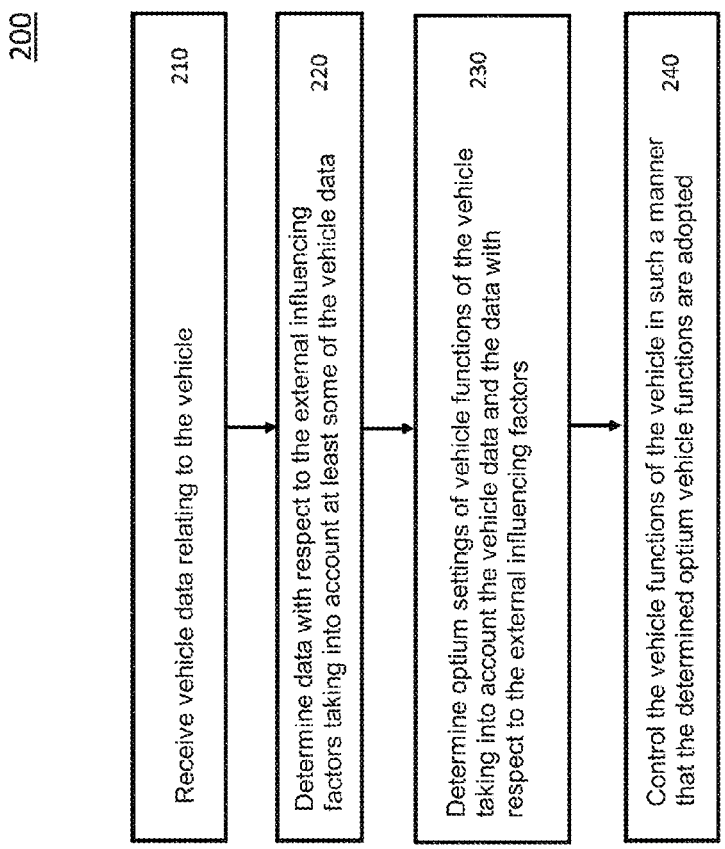
FIG. 2 is a flowchart which illustrates an exemplary method for automatically setting vehicle functions of a vehicle taking into account external vehicle functions.

FIG. 2 shows a flowchart illustrating a method 200 for automatically setting vehicle functions of a vehicle taking into account external vehicle functions, which method can be carried out on a system 100, as described with respect to FIG. 1.

The method 200 comprises:
receiving 210, at a back-end server 120, vehicle data relating to the vehicle 110;
determining 220, at the back-end server 120, data with respect to the external influencing factors taking into account at least some of the vehicle data;
determining 230, by means of the back-end server 120, optimum settings of vehicle functions of the vehicle 110 taking into account the vehicle data and the data with respect to the external influencing factors; and
controlling 240 the vehicle functions of the vehicle 110 in such a manner that the determined optimum vehicle functions are adopted.

The external influencing factors may comprise:
up-to-date air quality values;
up-to-date driving restrictions in environmental zones for emitting and/or highly emitting vehicles; and/or
local traffic specifications and/or traffic regulations which apply on the route.

The vehicle data may comprise:
current emission status data relating to the vehicle 110; and/or
at least one planned destination of the vehicle 110, wherein the planned destination of the vehicle 110 can comprise a latest arrival time of the vehicle 110 at the planned destination.

The vehicle functions may comprise:
a maximum speed which is needed
  to circumvent up-to-date driving restrictions in environmental zones; and/or
  to comply with local traffic specifications and/or traffic regulations; and/or
a modified route which is needed to circumvent up-to-date driving restrictions in environmental zones and/or local traffic specifications and/or traffic regulations; and/or
driving modes which influence the vehicle emissions of the vehicle 110.

The vehicle 110 may be a hybrid vehicle, wherein the vehicle data may comprise operating modes of the vehicle 110.

What is claimed is:

1. A system for automatically setting vehicle functions of a vehicle taking into account external influencing factors, comprising:
the vehicle; and
at least one back-end server which is configured to:
  receive vehicle data relating to the vehicle;
  determine data with respect to the external influencing factors taking into account at least some of the vehicle data;
  determine optimum settings of vehicle functions of the vehicle taking into account the vehicle data and the data with respect to the external influencing factors; and
  transmit the optimum settings of the vehicle functions to the vehicle, wherein:
the vehicle data comprise current emission status data of the vehicle with respect to a driving speed of the vehicle, and the current emission status data of the vehicle with respect to the driving speed of the vehicle are taken into account when determining the optimum settings of the vehicle functions,
the vehicle is configured to adopt the optimum settings of the vehicle functions,
the optimum settings of the vehicle functions comprise a maximum speed which is needed to circumvent current driving restrictions in environmental zones based on emission values of the vehicle at the maximum speed, and
the vehicle is configured to reduce a current speed of the vehicle to the maximum speed upon entering one of the environmental zones.

2. The system according to claim 1, wherein the external influencing factors comprise one or more of:
current air quality values;
the current driving restrictions in the environmental zones, wherein the current driving restrictions apply to emitting and/or highly emitting vehicles; and
local traffic specifications and/or traffic regulations which apply on the route.

3. The system according to claim 2, wherein the vehicle data further comprise:
at least one planned destination of the vehicle, wherein the planned destination of the vehicle comprises a latest arrival time of the vehicle at the planned destination.

4. The system according to claim 2, wherein the vehicle functions further comprise one or more of:
   (i) a maximum speed which is needed to comply with local traffic specifications and/or traffic regulations; and
   (ii) driving modes which influence the vehicle emissions of the vehicle.

5. The system according to claim 1, wherein
   the vehicle is a hybrid vehicle; and
   the vehicle functions further comprise operating modes of the hybrid vehicle.

6. A method for automatically setting vehicle functions of a vehicle taking into account external influencing factors, comprising:
   receiving, at a back-end server, vehicle data relating to the vehicle;
   determining, at the back-end server, data with respect to the external influencing factors taking into account at least some of the vehicle data;
   determining, by the back-end server, optimum settings of vehicle functions of the vehicle taking into account the vehicle data and the data with respect to the external influencing factors; and
   transmitting to the vehicle, by the back-end server, the optimum settings of the vehicle functions; and
   adopting, by the vehicle, the optimum settings of the vehicle functions, wherein:
   the vehicle data comprise current emission status data of the vehicle with respect to a driving speed of the vehicle, and the current emission status data of the vehicle with respect to the driving speed of the vehicle are taken into account when determining the optimum settings of the vehicle functions,
   the optimum settings of the vehicle functions comprise a maximum speed which is needed to circumvent current driving restrictions in environmental zones based on emission values of the vehicle at the maximum speed, and
   adopting the optimum settings of the vehicle functions comprises reducing a current speed of the vehicle to the maximum speed upon entering one of the environmental zones.

7. The method according to claim 6, wherein the external influencing factors comprise one or more of:
   current air quality values;
   the current driving restrictions in the environmental zones, wherein the current driving restrictions apply to emitting and/or highly emitting vehicles; and
   local traffic specifications and/or traffic regulations which apply on the route.

8. The method according to claim 7, wherein the vehicle data further comprise:
   at least one planned destination of the vehicle, wherein the planned destination of the vehicle comprises a latest arrival time of the vehicle at the planned destination.

9. The method according to claim 7, wherein the vehicle functions further comprise one or more of:
   (i) a maximum speed which is needed to comply with the local traffic specifications and/or traffic regulations;
   (ii) driving modes which influence the vehicle emissions of the vehicle.

10. The method according to claim 6, wherein
    the vehicle is a hybrid vehicle; and
    the vehicle functions further comprise operating modes of the hybrid vehicle.

\* \* \* \* \*